Aug. 18, 1931.  L. V. LUCIA  1,819,610

ELECTRICAL CIGAR LIGHTER

Filed Aug. 7, 1926  2 Sheets—Sheet 1

Inventor
Louis V. Lucia
By
Attorney

Aug. 18, 1931.  L. V. LUCIA  1,819,610
ELECTRICAL CIGAR LIGHTER
Filed Aug. 7, 1926   2 Sheets-Sheet 2
Fig. 9.
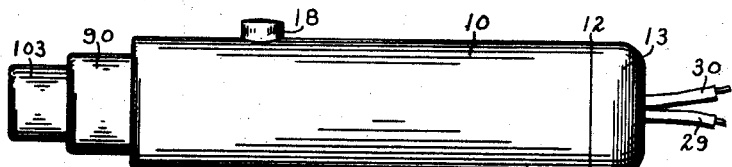
Fig. 10.
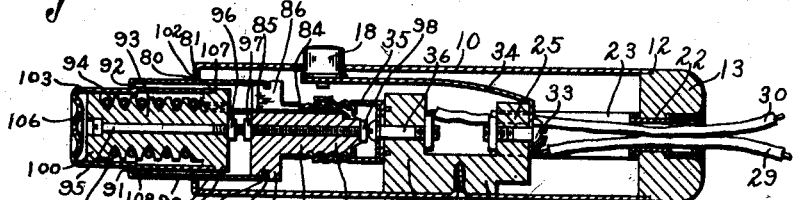
Fig. 11.
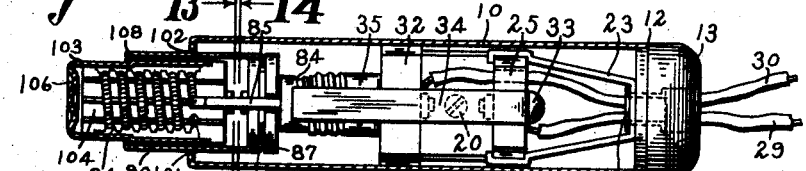
Fig. 12.   Fig. 13.   Fig. 14.
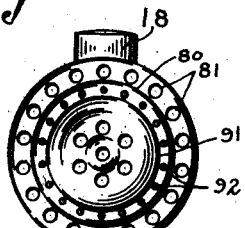 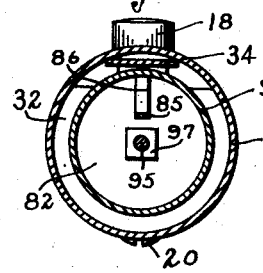 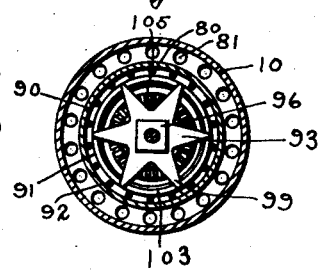
Fig. 8.
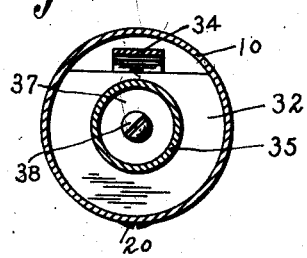
Inventor
Louis V. Lucia
By Horace L. ......
Attorney Patented Aug. 18, 1931

1,819,610

UNITED STATES PATENT OFFICE

LOUIS V. LUCIA, OF HARTFORD, CONNECTICUT, ASSIGNOR, BY MESNE ASSIGNMENTS, TO THE BEARDSLEY & WOLCOTT MFG. CO., A CORPORATION OF CONNECTICUT

ELECTRICAL CIGAR LIGHTER

Application filed August 7, 1926. Serial No. 127,931.

This invention relates to electrical heating devices and more especially to that type of such devices generally known as cigar lighters wherein the heating unit is energized by an electric current from a suitable source of power. More particularly, the invention relates to a cigar lighter of the class suitable for holding in the hand and contemplates one of such structure that no inconvenience will be experienced by the user due to excessive heat being transmitted by the casing thereof.

In devices of this character it has been the general practice to provide a hot wire or coil of wire exposed at one end of the device against which the cigar, cigarette or pipe is pressed to ignite the same. The wire in such devices occasionally becomes corroded by, or clogged with particles of tobacco, etc., which when charred tend to short circuit the coils of the wire, thus reducing the resistance thereof, whereby the heat producing efficiency of the device is decreased, or the wire is melted by the excessive heat produced, due to the reduction in resistance thereof, and the device becomes inoperative. The exposed wire also is liable to be broken by careless handling of the device, or articles placed closely against this may be inadvertently ignited causing damage by fire.

The principal object of this invention is to provide an electrical heating device of the cigar-lighter or the like type of generally improved structure, economical to manufacture and especially efficient in use.

Another object of this invention is to provide a cigar lighter wherein the parts are readily assembled together and retained in such assembly by means of a minimum number of retaining devices.

Another object of this invention is to provide a cigar lighter or similar device, with an improved form of heating unit.

Another object of this invention is to provide a cigar lighter or similar device, with an improved form of casing and wherein the structure thereof is such that the casing is maintained comparatively cool.

Still another object of this invention is to provide a cigar lighter or similar device, with an improved form of heating unit support.

Still another object of this invention is to provide a cigar lighter or similar device, with a heating unit casing whereby the heated wire thereof will be protected against the deleterious effect of direct contact therewith, by either articles to be ignited or articles inadvertently placed nearby.

A still further object of this invention is to provide a cigar lighter or similar article, wherein the heated parts are insulated from the remaining parts in such a manner that the transmission of heat between connected parts is negligible.

To these and other ends the invention consists in the novel features and combination of parts to be hereinafter described and claimed.

In the accompanying drawings:

Fig. 8 is a section on line 8—8 of Fig. 2;

Fig. 9 is a side view of a somewhat modified form of my device embodying features of this invention;

Fig. 10 is a longitudinal section of the device shown in Fig. 9;

Fig. 11 is a longitudinal section through the casing parts of same, taken at right-angles from the section of Fig. 10;

Fig. 12 is an end view of the same;

Fig. 13 is a section on line 13—13 of Fig. 11, and

Fig. 14 is a section on line 14—14 of Fig. 11.

Figure 1:
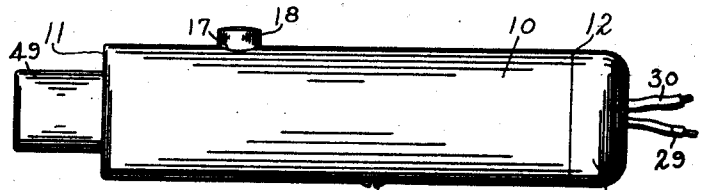
Fig. 1 is a side view of a device embodying the features of this invention.
Figure 2:
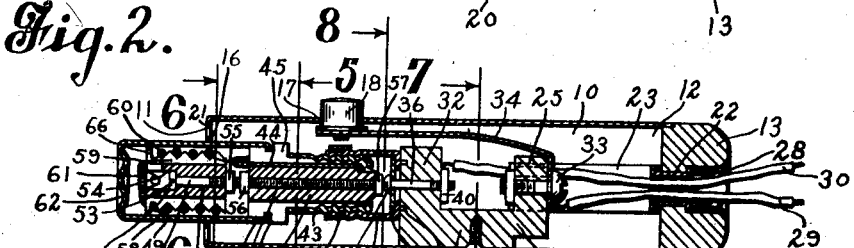
Fig. 2 is a longitudinal section through the same.
Figure 3:
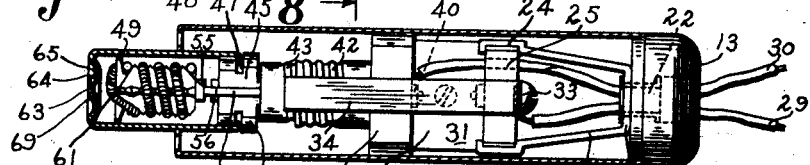
Fig. 3 is a longitudinal section through the casing parts of the same, taken at right-angles from the section of Fig. 2.

The electrical heating device selected to illustrate the features of this invention is in the form of a cigar lighter wherein a casing 10 of preferably cylindrical form having a closed end 11 and an open end 12 is provided to contain the remaining parts thereof. A plug 13 having a reduced portion 14 forming an annular shoulder 15, is provided to close the open end 12 which fits over the reduced portion 14 and abuts the shoulder 15. The closed end 11 is provided with an opening 16 to allow a part of the device to extend therethrough. An opening 17 is provided in the periphery of the casing to allow a switch button 18 to protrude therethrough. Another opening 19 is provided in the periphery of the casing through which suitable securing means, in this instance the screw 20, extends. A series of vent openings 21 are provided in the closed end 11 and arranged about the opening 16 between the same and the periphery of the casing 10.

The interior parts of the device are so constructed that they may be assembled as a unit and slipped into the casing 10 through the open end 12 thereof. Secured to the end plug or bushing 13, which is preferably of suitable insulating material, herein by means of the eyelet 22, is a U-shaped member 23. The member 23, by means of article gripping ends 24, which resiliently engage the sides of a flange 25 formed upon the rear end of an insulating block 26, spaces the block from the end of the casing 10 and secures it to the bushing 13. The eyelet 22 passes through the base 27 of the U-shaped member and through the bushing into an end recess 28 and being hollow permits the passage of terminal wires 29 and 30.

The block 26 comprises a base portion 31 having the rear flange 25 and a forward flange 32, extending vertically therefrom. The outer surface of the base portion 31 is formed to fit the inner periphery of the casing 10. The screw 20 threads into the base portion 31 and secures the block and all parts connected thereto in the proper position, and comprises the sole retaining means by which these parts are secured therein. Clamping means, such as a bolt 33 passes through the flange 25 and secures a resilient contact strip 34 thereto. The flange 32 is formed upon its periphery to snugly fit against the interior peripheral wall of the casing 10, thus centering the block 26 therein. A socket shell 35 is clamped to the forwardly directed face of the flange 32 by suitable means, such as the bolt 36, there being an insulating member 37 under the head 38 to insulate it from the shell 35. Prongs 39 extend from the base of the shell 35 into the flange to prevent relative movement therebetween. The nut 40 is adapted to draw the parts so assembled together and to retain them in position. The terminal wires 29 and 30 are electrically connected to the bolt 33 and bolt 36 respectively. The resilient contact strip 34 extends forwardly over the flanges 25, 32 and the shell 35 and is adapted to be pressed into contact with the shell 35 by means of the button 18 which rests upon it and is held protruding outwardly through the opening 17 in the casing 10, due to the resiliency thereof. The button is provided with a flange 67, whereby it is prevented from passing entirely through the opening 17.

The shell 35 is provided with means whereby a core base 41 is retained in connection therewith, and concentric thereto. In this instance the shell 35 is provided with threads 42 which engage threads formed in the material of a metallic sleeve 43. The sleeve 43 threads upon the rear end of the base 41 by cooperating with threads formed thereon. A resilient terminal strip 44 is secured to the base 41 by the sleeve 43 and pressed into a longitudinally disposed grove or flute 45 during the threading engagement thereof. The strip 44 extends forwardly beyond the base 41.

Figures 4, 5, 6:
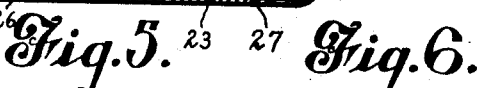
Fig. 4 is an enlarged front view of the same.
Fig. 5 is a section on line 5—5 of Fig. 2.
Fig. 6 is a section on line 6—6 of Fig. 2.
Figure 7:
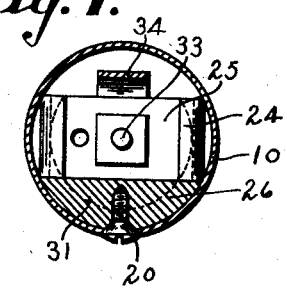
Fig. 7 is a section on line 7—7 of Fig. 2.

The core base 41 is provided with a plurality of grooves or flutes similar to the flute 45, in this instance four, see Fig. 5. An opening 46 extends longitudinally through the center of the core base 41. An annular recess 47 is formed about the periphery of the forward end of the core base 41, into which are crimped the edges of the mouth end 48 of a ferrule 49.

A core spider 50 is disposed within the ferrule 49 and has an opening 51 longitudinally extending through the center thereof. Connecting means such as a screw 52, having a head 53 seated in a countersunk portion 54 of the opening 51, passes through the spider 50 and the core base 41. A nut 55 threadingly engages the screw 52 at the rear end of the spider 50 and clamps the same thereto. Another nut 56 threadingly engages the screw 52 at the forward end of the base 41 and a nut 57 threadingly engages the screw 52 at the rear end of the base 41. The base 41 is therefore secured to the screw 52 between the nuts 56 and 57.

The nuts 55 and 56 are spaced apart upon the screw 52 a suitable amount to prevent the transmission of heat therebetween, except through the body of the screw 52. The spider 50 is provided with annular grooves 58 simulating threads about its periphery and with a plurality of longitudinally extending flutes or grooves 59, there being six provided in this instance, the longitudinally extending flutes 59 being formed deeper into the material than the annular grooves 58. The spider 50 is provided with radially projecting fingers 66 at its forward end which are adapted to contact with the inner periphery of the ferrule 49 to center the spider therein.

A length of coiled resistance wire 60 is suitably wound upon the periphery of the spider 50 in the annular grooves thereof whereby it is suspended and substantially surrounded by air, and extends across the front end of the spider as at 61, where it lies closely adjacent to the closed end 62 of the ferrule 49. One end of the wire 60 is electrically connected to the screw 52 and the terminal wire 30 through the screw or bolt 52, due to the inner end of the same contacting with the head 38 of the bolt 36, when the sleeve 43 and shell 35 are in complete threaded engagement. The other end of the resistance wire 60 is electrically connected to the forward end of the terminal strip 44 and the terminal wire 29, when the button 18 is pressed to contact the contact strip 34 with the shell 35, which is electrically as well as mechanically connected to the sleeve 43 when in threaded engagement therewith, the sleeve 43 being in contact with other terminal strip, due to its resiliency, as soon as it is assembled to the core base 41.

The closed end 62 of the ferrule 49 is provided with a central opening 63 which is surrounded by an inwardly recessed groove 64 wherein a plurality of openings 65 are formed.

From the above description it is obvious that the interior parts may all be readily assembled together and slipped into the casing 10 until the open end 12 thereof abuts the shoulder 15 upon the bushing 13. While so doing the button 18 is held in the opening until the strip 34 is in position to retain it. When the single screwing means or screw 20 is threaded into the block 26 the device is completely assembled and the ferrule 49 will protrude forwardly through the opening 16 in the forward or closed end 11 of the casing 10. The block engaging fingers 24 are retained in engaged position with the flange 25 when the parts are assembled to the casing 10, being prevented from spreading apart by engagement with the interior of the enclosing casing 10.

When the terminal wires 29 and 30 are suitably connected to a source of electrical energy the device is ready for operation as a cigar lighter. The user may now press the button 18 to energize the wire 60 which, due to its resistance, becomes heated, and by radiation heats the ferrule 49, so that by applying the cigar, cigarette or other article to be ignited, to the end of the ferrule 49 and drawing on the same, as is necessary to ignite such an article, heated air of the proper temperature will be directed thereagainst. Due to the particular arrangement of the parts in this device the heating element or wire 60 is protected by the ferrule 49 and cannot contact with the article to be ignited or upon which the device rests. Because of the slight amount of metal in contact with the heating or heated parts of this device, the casing 10 which also acts as a handle for the same, does not become uncomfortably warm even adjacent the forward end, especially in view of the fact that cool air is drawn in through the vent openings 21 and circulates about the interior of the casing 10.

The air that is drawn in by the user during the operation of this device circulates rearwardly through the openings 21 over the exterior of the ferrule 49 and then forwardly through the grooves 45 of the core base 41 and over the interior surface of the ferrule 49 while being drawn over and under the heated coils of the wire 60 and passing out through the opening 63 and openings 65 in the ferrule. As the air is thus drawn into the casing 10 and over the heated ferrule surfaces and over and under the coils of wire 60 it becomes heated to such a degree that it will readily ignite the cigarette, cigar or other article placed against the closed end of the ferrule. By preheating the air by causing it to pass over the heated ferrule 49 before it reaches the coils of wire 60 or the wire portion 61 an exceptionally efficient device both in respect to its rapidity of operation and energy consumption is provided as the cool indrawn air does not immediately contact with the wire but is gradually brought up to the igniting temperature. By the above construction the resistance wire is long-lived and free from the danger of both mechanical and electrical damage.

The percular form of the closed end of the ferrule 49 insures that the article to be ignited will not be mutilated to such a degree that the efficient ignition thereof will be interfered with. For instance, if a cigarette is to be ignited the end thereof is pressed against the raised central portion 69 of the ferrule end in which the opening 63 is located and the cigarette will tend to spread at the end due to the inwardly sloping surfaces surrounding this portion of the ferrule end. The ignited end of the cigarette, therefore, is not squeezed together preventing the proper drawing in of air, nor is the outside wrapper folded in over the end thereof but by being spread apart and the wrapper opened up, the air is readily drawn in and efficient and rapid ignition is facilitated.

As a result of my improved construction, it will also be noted that the openings 21 and the passages leading therefrom through the igniter carrying end of the casing to the apertures 63, 65 act to provide air insulating passages tending to reduce the temperature of the heater carrying end of the casing, which otherwise would become quite hot, especially when, as is preferable, the casing 10 is of metal. More specifically, cool air is drawn in through the openings 21, and this cool air acts to carry away the heat in the inner end of the casing 10 as the air is preheated as above described. It will also be noted that through the use of the protruding ferrule 49 it is made possible for the lighter to be laid down upon a counter or the like without the heated end of the same causing burning. It will also be noted that by making the members 26, 41, 49, 23, and 13 as a unit it is possible to assemble the same in the casing 10 with great facility; it only being necessary after the push button 18 has been properly positioned, to insert this unit through the large or open end of the casing 10 so that the ferrule 49 will project through the axial opening in the closed end of the casing and the member 34 will come under the inner end of the button 18, whereupon the screw 20 may be inserted to complete the assembly operation. Attention is also directed to the fact that the heating element and member 41 form another unit adapted to be readily inserted, from the opposite end if desired, and connected to the front end of the base 26 by simply threading into the socket therein. The end closure 13 is also quickly connectible through the spring members 23, 24 to the opposite end of the base 26, all in such manner as to facilitate the assembly of the parts ready for insertion in the casing 10. These and other advantages of my improved construction will, however, be clearly apparent to those skilled in the art.

The modified form of cigar lighter shown in Figs. 9–14 incl., comprises many parts which are similar or identical in structure, form and operation to corresponding parts of the preferred form above described. These parts are as follows: the casing 10, having an open end 11 and a closed end 12, plug or bushing 13, button 18, contact strip 34, U-shaped member 23, eyelet 22, block 26 having flanges 32 and 25, the securing means or screw 20, the terminal wires 29 and 30, the shell 35 and the bolts 33 and 36. These parts are assembled together and cooperate in the modified form in the same or similar manner as in the preferred form.

The closed end 11 of the case 10 in the modified form is provided with a central opening 80 which is surrounded by a plurality of vent openings 81, disposed in the face of the closed end between the opening 80 and the periphery of the casing. The openings 81 permit air to enter the casing 10 which by circulation therein maintains the same at a temperature sufficiently low to comfortably permit its use as a handle means for the device.

A somewhat modified form of core-base 82 is provided upon the rear end 83 of which a threaded sleeve 84 is secured. The threaded sleeve 84 is adapted to threadingly engage the shell 35 as in the preferred form and also to thread upon the base 82. When threaded upon the base 82 a terminal strip 85 is clamped within a groove 86 extending longitudinally through and beyond the base 82. An annular flange 87 is provided at the forward end of the base 82 and in the periphery of this flange an annular groove 88 is provided into which is crimped the end edges 89 of an inner ferrule 90.

The inner ferrule 90 is closed at the forward end and has an opening 91 in the center of this end which is surrounded by a plurality of air inlet openings 92 disposed between the opening 91 and the periphery of the ferrule 90. The ferrule 90 is adapted to extend forwardly out of the casing 10 through the opening 80 therein.

A spider 93 having a plurality of annular thread arranged grooves 94 about its periphery and a plurality of longitudinal grooves or flutes 104 extending along its periphery is provided. The spider 93 is secured to the base 82 by a screw or bolt 95 and nuts 96, 97 and 98 in the same manner as the corresponding parts of the preferred form, the inner end of the bolt 95 being adapted to contact with the bolt 36. Rear and front flanges 99 and 100 respectively are formed upon the spider 93, the rear one 99 having a forwardly directed shoulder 101 formed thereon by a reduced portion 102 and the front one 100 being adapted to engage the inner wall of an outer ferrule 103. The terminal strip 85 extends beyond the flange 99 through one of the grooves 104 and is electrically connected to the end of a length of coiled resistance wire 105 wound about the spider 93 in the annular grooves 94 thereon. The other end of the wire 105 is electrically connected to the screw or bolt 95 as in the preferred form.

The outer ferrule 103 is provided with a closed end 106 and an open end 107, the latter being adapted to seat over the reduced portion 102 of the flange 99 and in abutment with the shoulder 101. Intermediate the ends 106 and 107 the ferrule 103 is provided with a shoulder 108 which cooperates with the material of the ferrule 90 about the opening 91 to prevent movement of the ferrule 103 in a forward direction. The closed end of the ferrule 103 is formed in the same or similar manner and provided with the same or similar openings previously described relative to the ferrule 49 of the preferred form and therefore need not be described in detail.

As in the preferred form the article to be ignited is pressed against the closed end of the outer ferrule 103 and the button 18 is pressed to close the circuit supplying electrical energy to the resistance wire 105 which becomes heated. The air drawn in by the user through the article to be heated passes in through the openings 92 in the ferrule 90 along the longitudinal grooves 104 under and over the heated wire 105 and out through the outlet openings in the closed end 106 of the ferrule 103 and after a short interval ignites the end of the article.

While I have shown and described preferred embodiments of my invention, it is to be understood that the same is not to be limited thereto in all of the details shown but is capable of modifications and variations which will be within the spirit of the invention and scope of the appended claims.

What I claim is:—

1. A cigar lighter or the like comprising a casing having a closed end presenting a small opening and an open end presenting a larger opening, and means to ignite an article disposed within said casing and having conductor connections at the open end and an igniting portion at the other end and extending out through the small opening in the closed end of said casing, and a portion adapted to close the open end thereof, said closure being insertible through the open end of said casing.

2. A cigar lighter or the like comprising a casing having a closed end presenting a small opening and an open end presenting a larger opening, a closure member for the open end of said casing, a block member within the casing secured to and spaced from said closure member, and means within the casing and extending from said block member out through the small opening in the closed end of said casing to ignite an article, said closure member and block being insertible as a unit through said open end.

3. A cigar lighter or the like comprising a casing having a closed end presenting a small opening and an open end presenting a larger opening, a closure member for the open end of said casing, terminal connections within the casing inside said closure member, and igniting means within the casing and connected to said terminal connections and extending out through the small opening in the closed end of said casing, said terminal connections and closure member being insertible through the open end of said casing and said igniting means being separately removable through said small opening in the opposite end of the casing.

4. In a cigar lighter or the like, a casing having a closed end provided with a small opening therein, and means within said casing to ignite an article and having a projecting igniting part extending out through said small opening in said casing at the closed end thereof, the end face of said projecting igniting part having an outwardly projecting portion substantially in the center thereof, and an inwardly recessed groove surrounding said outwardly projecting portion.

5. A cigar lighter or the like comprising a hollow casing having an open end and a closed end provided with a central opening and a plurality of air inlet openings surrounding the central opening, a block within said casing, a socket shell secured to said block, a fluted core base engaging said shell, a fluted spider spaced from and secured to said core base, resistance wire wound about said spider, a ferrule enclosing said spider and wire, said ferrule protruding through the central opening in the closed end of said casing, electrical terminal wires electrically connected to said socket shell, and single means to retain said parts within said casing.

6. A cigar lighter or the like comprising a hollow casing having an open end and a closed end provided with a central opening, and a plurality of air inlet openings surrounding the central opening, a block within said casing, a socket shell secured to said block, a fluted core base engaging said shell, a fluted spider spaced from and secured to said core base, resistance wire wound about said spider, a ferrule enclosing said spider and wire, said ferrule protruding through the central opening in the closed end of said casing, electrical terminal wires electrically connected to said socket shell, and a switch mechanism for opening and closing the electrical circuit including a button extending through said casing.

7. In an electrical heating device, a heating unit comprising a ferrule having closed sides and an open end and a closed end, the latter forming an axial abutment for articles to be ignited and having an air aperture therein, and a heating element for said abutment disposed longitudinally within said ferrule, said heating element providing a longitudinal draft therethrough and comprising a part of insulating material having annular grooves about the periphery thereof and flutes extending longitudinally thereof and a length of resistance wire wound about said part in the annular grooves thereof.

8. In a cigar lighter or the like, a ferrule having closed sides and a closed end presenting an abutment for articles to be heated and provided with an air opening therein, a heating element within said ferrule including a length of resistance wire, and means to support said wire suspended in said ferrule and disposed longitudinally of the ferrule and having air passage means whereby air drawn through said air opening will pass over and about said wire and be heated thereby when said wire is energized and prior to passing through said air opening in the abutment.

9. In a cigar lighter or the like, a casing having a closed end provided with an axial opening and a series of surrounding openings, a part secured to and within said casing, electrical terminals secured to said part and within the opposite end of said casing from said axial opening, a heating unit carried by said part and projecting out of said casing through said axial opening, said heating unit comprising a heating element providing a draft therethrough and including a length of resistance wire and terminals therefor connected to said first mentioned terminals, and a ferrule projecting through said axial opening and having closed sides enclosing said wire and having a closed end provided with openings.

10. A heating unit for a cigar lighter or the like comprising a base core having side and end electrical terminals secured thereto, a ferrule secured to an end of said base core and having closed sides and a perforated end, a heating member within said ferrule and between said ferrule end and base having a length of resistance wire wound thereon, means to connect said wire to said terminals including a member extending axially of both said base and heating member, and means on said axial member spacing said base axially from said heating member.

11. A heating unit for a cigar lighter or the like comprising a base member having electrical terminals thereon at one end thereof and a ferrule secured to the other end thereof, said ferrule having a closed end provided with openings therein, and a heating unit carried by said base and spaced therefrom and having a length of resistance wire within said ferrule and electrically connected to said terminals, said heating unit and base member having flutes therein allowing the passage of air longitudinally of said base, heating unit and ferrule and out through the openings in the end of the latter.

12. In a cigar lighter of the type described, a heating unit having a length of resistance wire suspended within an enclosing ferrule and air passages permitting air to flow from end to end of said ferrule outside said wire and also between it and said ferrule, said ferrule having closed sides and openings in each end thereof whereby air may be drawn therethrough and over said wire to be heated thereby.

13. A cigar lighter or the like comprising a casing adapted to be grasped in the hand and having a closed end, an opening in said closed end, and vent openings outside the opening in said end, a ferrule in said casing having closed sides and projecting out through the opening in said closed end, a heating element within said casing projecting into said ferrule, and means including openings in the outer end of said ferrule and through said heating element whereby air may be drawn into said casing through said vent openings and past said element through said ferrule and out through the openings in the outer end of said ferrule.

14. A cigar lighter or the like comprising a casing having a closed end, an opening in said closed end, and vent openings about the opening in said end, a ferrule in said casing having closed sides and projecting out through the opening in said closed end and having openings in its projecting end, a length of resistance wire suspended within said ferrule, means to support said wire extending into the ferrule and permitting air flow through the latter, means to support said ferrule and wire support disposed in the casing and permitting air flow through the latter elements and carrying terminals for said wire, and means in said casing to support said last mentioned supporting means, said last named means including electrical contact means for said terminals, a base block carrying said contact means, and conductor connections in said casing and connected to said contact means.

15. In combination, a heating element for a cigar lighter or the like comprising a longitudinally fluted base and a length of wire wound annularly thereabout whereby the wire is suspended in the surrounding air, and an abutment opposite one end of said base apertured to permit air to be drawn therethrough and through said base by a smoker and so spaced from and covering the end of said base as to prevent contact with the latter or said wire.

16. A cigar lighter or the like comprising a casing having one end provided with an opening of smaller diameter therein, a ferrule protruding through said opening, a heating element within said ferrule and having a terminal carrying plug, and terminal connections for said heating element within said casing and nearer the opposite end thereof than said heating element having a socket into which said plug is receivable.

17. A cigar lighter or the like comprising a casing having one end provided with an opening of smaller diameter therein, a ferrule protruding through said opening, a heating element within said ferrule, a threaded terminal plug carrying said ferrule and element and terminal connections for said heating element within said casing and nearer the opposite end thereof than said heating element into which said plug is threaded.

18. A cigar lighter or the like comprising a casing having one end provided with an opening of smaller diameter therein, a ferrule protruding through said opening, a heating element within said ferrule, and terminal connections for said heating element within said casing and nearer the opposite end thereof than said heating element, said heating element and ferrule forming a unit insertible through said opening and threaded into said terminal connections and said terminal connections being insertible through the opposite end of said casing.

19. In a heating unit for cigar lighters or the like, a heating element carrying a resistance wire, a base disposed coaxially therewith including a threaded plug electrically connected to one end of said wire, and an axial connecting means connecting said heating element and base, both said heating element and said base being provided with longitudinally extending flutes therein.

20. In an electric cigar lighter or the like, a base carrying on one end thereof a heating element and adapted to be inserted in a casing, an end closure for the opposite end of the casing from said heating element, and spacing means carried by said end closure and projecting therefrom and connected to said base at the opposite end thereof from said heating element.

21. In an electric cigar lighter or the like, a base carrying on one end thereof a heating element and adapted to be inserted in a casing, an end closure for the opposite end of the casing from said heating element, and spacing members projecting from said end closure and carried thereby and adapted to snap over portions of said base at the opposite end thereof from said heating element.

22. In an electric cigar lighter or the like, a base carrying on one end thereof a heating element and adapted to be inserted in an opposite end of the casing from said heating element, an end closure for the casing, spacing members projecting from said end closure and engaging said base at the opposite end thereof from said heating element, and a rivet connecting said spacing members to said closure means and forming a conduit for conductors connected to said base.

23. In combination, a base, a socket carried on one side thereof, a heating element having a base received in said socket, spacing means carried on the opposite side of said base from said socket, a closure member carried by said spacing means, conductors extending through said closure member, one connected to said socket, and a movable contact member carried by said base and connected to the other conductor and controlling the circuit through said pocket.

24. In combination, a base, a socket carried on one side thereof, a heating element having a base received in said socket, spacing means carried on the opposite side of said base from said socket, a closure member carried by said spacing means, conductors extending through said closure member, one connected to said socket, a movable contact member carried by said base and connected to the other conductor and controlling the circuit through said socket, and a casing adapted to receive said elements through one end thereof and having a smaller aperture in its opposite end through which said heating element extends.

25. In combination, a base, a socket carried on one side thereof, a heating element having a base received in said socket, spacing means carried on the opposite side of said base from said socket, a closure member carried by said spacing means, conductors extending through said closure member, one connected to said socket, a movable contact member carried by said base and connected to the other conductor controlling the circuit through said socket, and a casing adapted to receive said elements through one end thereof and carrying provision for positioning the same therein, said casing having a projecting ferrule adapted to receive the outer end of said heating element, a movable button engageable with said contact member, and a connecting means engageable with said base.

26. In a cigar lighter or the like, a casing having an open end and an aperture in its opposite end and another in its side, heating means insertible therein through said open end and projecting through said end aperture including a movable controlling member disposable beneath said side aperture, and a button seated in said side aperture engageable with said controlling member as the latter is inserted and movable thereafter manually to actuate the latter, said button having means for preventing lateral loss of said button through said aperture.

In testimony whereof I affix my signature.
LOUIS V. LUCIA.